United States Patent
Sugiyama

[11] Patent Number: 5,528,315
[45] Date of Patent: Jun. 18, 1996

[54] IMAGE PROCESSING MEMORY INTEGRATED CIRCUIT

[75] Inventor: Kenji Sugiyama, Yokosuka, Japan

[73] Assignee: Victor Company Of Japan, Ltd., Yokohama, Japan

[21] Appl. No.: 274,047

[22] Filed: Jul. 12, 1994

[30] Foreign Application Priority Data

Jul. 12, 1993 [JP] Japan .................................. 5-195170

[51] Int. Cl.$^6$ .................................................. H04N 9/64
[52] U.S. Cl. ........................... 348/714; 348/715; 348/718; 348/584
[58] Field of Search ..................... 348/714, 715, 348/718, 584, 595, 598; 345/115, 116, 190, 200; H04N 9/64

[56] References Cited

U.S. PATENT DOCUMENTS

| | | | |
|---|---|---|---|
| 4,982,285 | 1/1991 | Sugiyama | 358/136 |
| 4,985,768 | 1/1991 | Sugiyama | 358/136 |
| 5,150,458 | 9/1992 | Masuzaki | 345/115 |
| 5,317,397 | 5/1994 | Odaka | 348/416 |

*Primary Examiner*—James J. Groody
*Assistant Examiner*—Sherrie Hsia
*Attorney, Agent, or Firm*—Jacobson, Price, Holman & Stern

[57] ABSTRACT

An image processing memory integrated circuit used for a signal processing circuit is disclosed. In the bidirectional prediction, pixel values for two-frame images are stored in a memory cell array. The stored pixel values are read on the basis of address of two-dimensional block. The read pixel values of the two images in the block are added by an adder at an appropriate ratio. The resulting inter-image prediction signal and the interpolation signals are outputted to the outside. In the unidirectional prediction, pixel values for one-frame images are stored in a memory cell array. From the memory cell array, pixel values of two-dimensional block expanded from the above-mentioned block are read. The read pixel value is adaptively added to the pixel value delayed by a predetermined number of pixel from the read pixel value through an adder at an appropriate ratio.

3 Claims, 6 Drawing Sheets

IMAGE PROCESSING MEMORY INTEGRATED CIRCUIT

BACKGROUND OF THE INVENTION

1. Field of the Invention

The present invention relates to an image memory suitable for use as an apparatus for transmitting, displaying and accumulating image information, and more specifically to an image processing memory integrated circuit for executing inter-image processing on the basis of addition of a plurality of images.

2. Description of the Prior Art

For a high efficiency encoding of moving images (e.g., television signals), prediction processing is executed between frames or between fields, and differential between the obtained prediction signals and the current signals, that is, the prediction residual signals are coded.

In the moving image coding system termed MPEG (Moving Pictures Expert Group) system standardized by ISO (International Organization for Standardization)/IEC (International Electrotechnical Commission), bidirectional prediction is executed on the basis of frames preceding and succeeding frames to be coded. In the bidirectional prediction, there exist two cases where the prediction signals are formed by adding inter-frame prediction images in the forward direction with respect to time and where the prediction signals are formed by adding inter-frame prediction images in the reverse direction with respect to time.

The frame prediction relationship of the coding on the basis of the bidirectional prediction will be described hereinbelow with reference to FIG. 1.

FIG. 1 shows an example of inter-image prediction including the bidirectional prediction.

In FIG. 1, P denotes a unidirectional prediction frame the past and feature frames. The P frames are arranged for each three frames. Only the P frames are used for prediction. The P frame is predicted on the basis of the preceding P frame, and the B frame is predicted on the basis of both the preceding and succeeding P frames with respect to time.

Since both the preceding and succeeding P frames are necessary for prediction of the B frame, the sequence of the frames to be coded and decoded is changed with respect to each other. That is, in the input image, the P frame after the B frame is coded or decoded in advance of the B frame.

On the other hand, in the interlace signals, there exists the case where the even and odd fields are added to each other as the prediction signals.

When the prediction signals are formed by addition of a plurality of images as described above, the addition of the preceding and succeeding images with respect to time provides the prediction signals suitable for image changes along the time axis. On the other hand, the addition of the even and odd fields provides the prediction signals which can represent a minute motion in the vertical direction. Further, since the quantization error and the noise components can be suppressed by the addition, it is possible to execute more appropriate inter-image prediction.

As an example of the apparatus for adding a plurality of images and then processing the added video signals, a decoding apparatus for decoding image information coded by use of the bidirectional inter-frame prediction will be described hereinbelow with reference to FIG. 2.

FIG. 2 is a block diagram showing an example of the prior art decoding apparatus.

In FIG. 2, compressed image information is inputted through a code input terminal 31 and then given to a variable length decoder 32. In this variable length decoder 32, the variable length codes are returned to the fixed length codes, and the obtained fixed length codes are given to a reverse quantizer 33.

Further, from the variable length decoder 32, address information related to a block to be processed (i.e., a block address) is given to a memory controller 81; prediction mode information is given to two multipliers 63 and 64, respectively; and frame type (P or B) information is given to two switches 36 and 37, respectively.

In the reverse quantizer 33, the values representative of quantization corresponding to the fixed length codes can be obtained, and reproduced DCT (discrete cosine transformation) coefficients are given to a reverse DCT 34.

The reverse DCT 34 processes the reverse transformation of the DCT to reproduce the prediction residual signals. The obtained prediction residual signals are given to a prediction signal adder 35.

The prediction signal adder 35 adds the prediction signals given by an adder 62 to the prediction residual signals to obtain reproduced video signals.

The reproduced video signals are given to an image memory 65 via the switch 36 in the case of the unidirectional prediction frame (P frame). At the same time, the reproduced video signals of the preceding P frame are outputted from the image memory 65, and then given to a block reverse converter 38 via the switch 37. Here, the reason why the reproduced video signals of the P frame are delayed is that the reproduced video signals are transmitted in advance for the inter-image prediction of the B frame.

On the other hand, in the case of the bidirectional prediction frame (B frame), the switches 36 and 37 are changed over, so that the reproduced video signals outputted by the prediction signal adder 35 are given to the block inverse converter 38 as it is.

In the above-mentioned processing, the video signals are inputted and outputted in unit of spatial two-dimensional pixel block (e.g., of 16×16 pixels). Therefore, in the block reverse converter 38, the signals in unit of block are returned to signals used in the ordinary raster scanning (usually used for display) and then outputted through a video output terminal 39.

In the image memory 65, the reproduced video signals for one frame (P frame) are stored. The accumulated reproduced video signals are read in unit of block in accordance with the logical address information given by the memory controller 61. The read reproduced video signals are given to an image memory 66, and simultaneously to the multiplier 63 as the reverse direction prediction frame signals predicted on the basis of the succeeding frame with respect to time.

In the image memory 66, the video signals for one frame given by the image memory 65 are stored. Further, the forward direction prediction frame signals predicted on the basis of the preceding frame with respect to time are read from the image memory 66 in accordance with the logical address information given by the memory controller 61. The read frame signals are given to the multiplier 64.

In the multipliers 63 and 64, coefficients K1 and K2 are multiplied, respectively for each block according to the prediction mode. Here, the coefficients K1 and K2 are 0 or more but less than 1, and the addition of both K1 and K2 is 1.

For instance, in the case of only the forward direction prediction, the coefficient K1 of the multiplier 63 is determined to be 0 and the coefficient K2 of the multiplier 64 is determined to be 1. Further, in the case of only the reverse direction prediction, the coefficient K1 of the multiplier 63 is determined to be 1 and the coefficient K2 of the multiplier 64 is determined to be 0. In the case of the average prediction of both, the coefficients K1 and K2 are both 0.5.

The reproduced video signals weighted by the multipliers 63 and 64 as described above are given to the adder 62, respectively. In the adder 62, the two signals given by the multipliers 63 and 64 are added to obtain completed prediction signals. The obtained complete prediction signals are given to the prediction signal adder 35.

Here, the image memory 65 or 66 shown in FIG. 2 is composed of a semiconductor memory such as D-RAM (memory in and from which data can be written and read at any time and which requires memory holding operation).

A semiconductor memory integrated circuit of this type will be described hereinbelow with reference to FIG. 3.

In FIG. 3, an address signal inputted through an address input terminal 51 is given to an address decoder 53 via an address buffer 52. The address signal is usually inputted being divided into two and sequentially in series. For instance, in the case of the memory having 220 addresses, the address is inputted 10 bits by 10 bits as a row address and a column address, respectively.

In the address decoder 53, the transmitted logical address information of the row address and column address is developed into an actual physical address of a memory cell array 12, so that a memory cell corresponding to the physical address can be accessed.

At the write timing, the video signals inputted through the data input terminal 1 are written in designated positions of the memory cell array 12 through an input buffer 2.

At the read timing, the video signals outputted by designated positions of the memory cell array 12 are outputted through a data output terminal 11 via an output buffer 3.

In the case of the high efficiency coding for executing the bidirectional inter-image prediction processing or in the case of the image rate transformation for transforming the number of images per unit time, two images must be processed for each one-image processing. Accordingly, the number of the video signals read from the image memory is twice larger than that of the video signals to be processed.

On the other hand, in the image processing apparatus, although the image memory is usually constructed as an element formed independently from the other elements, since the input and output transfer speed of the D-RAM is not sufficiently high in comparison with the speed of the video signals of moving images, it has been so far necessary to increase the number of the transmission lines in order to read a great number of video signals ( whose number is twice larger than that of the video signals to be processed), thus raising a problem in that the apparatus construction is complicated.

In addition, in the case where the picture motion is compensated for on the precision finer than one pixel (e.g., ½ pixels), since the pixels whose number is larger than that of the pixels of the signals to be processed are required, it has been so far necessary to increase the transfer rate of the signals read from the image memory.

Further, in the prior art image memory, even in the case where the video signals are read in the state of two-dimensional pixel block composed of rows and lines (e.g., 16×16 pixels), since the address must be designated to at least each row, the large address information is required, with the result that there exists a problem in that the number of the transmission lines increases.

SUMMARY OF THE INVENTION

With these problems in mind therefore, it is the object of the present invention to provide an image processing memory integrated circuit usable for a signal processing circuit, which can be connected to the signal processing circuit via a reduced number of pins so that the size of the integrated circuit can be reduced.

To achieve the above-mentioned object, the image processing memory integrated circuit for processing digital image information between images different with respect to time according to the present invention comprises: main storing means for storing image pixel values and outputting the pixel values in unit of spatial two-dimensional pixel block; subsidiary storing means for storing the pixel values outputted by said main storing means and outputting the pixel values in unit of spatial two-dimensional pixel block; and adding means for weighting and adding the outputs of said main storing means and said subsidiary storing means, objects to be processed by said adding means being spatially adjacent pixel blocks of two images different with respect to time.

Further, the image processing memory integrated circuit for processing digital image information between images different with respect to time according to the present invention comprises: main storing means for storing image pixel values and outputting the pixel values in unit of spatial two-dimensional pixel block; delaying means for delaying and outputting the output of said main storing means; adding means for weighting and adding the outputs of said main storing means and said delaying means; and outputting means for outputting added results of said adding means after discarding pixels corresponding to a part of row and/or column pixels in the spatial two-dimensional pixel block.

Further, the image processing memory integrated circuit according to the present invention further comprises: a first address controller for repeating operation of shifting pixel by pixel a physical address of one row or one column of the two-dimensional block provided in said main storing means; and a second address controller for shifting pixel by pixel a physical address in a direction different from that of said first address controller, whenever said first address controller has completed the shift operation beginning from a start point to an end point in one row or one column.

DETAILED DESCRIPTION OF THE EMBODIMENTS

Figure 4:
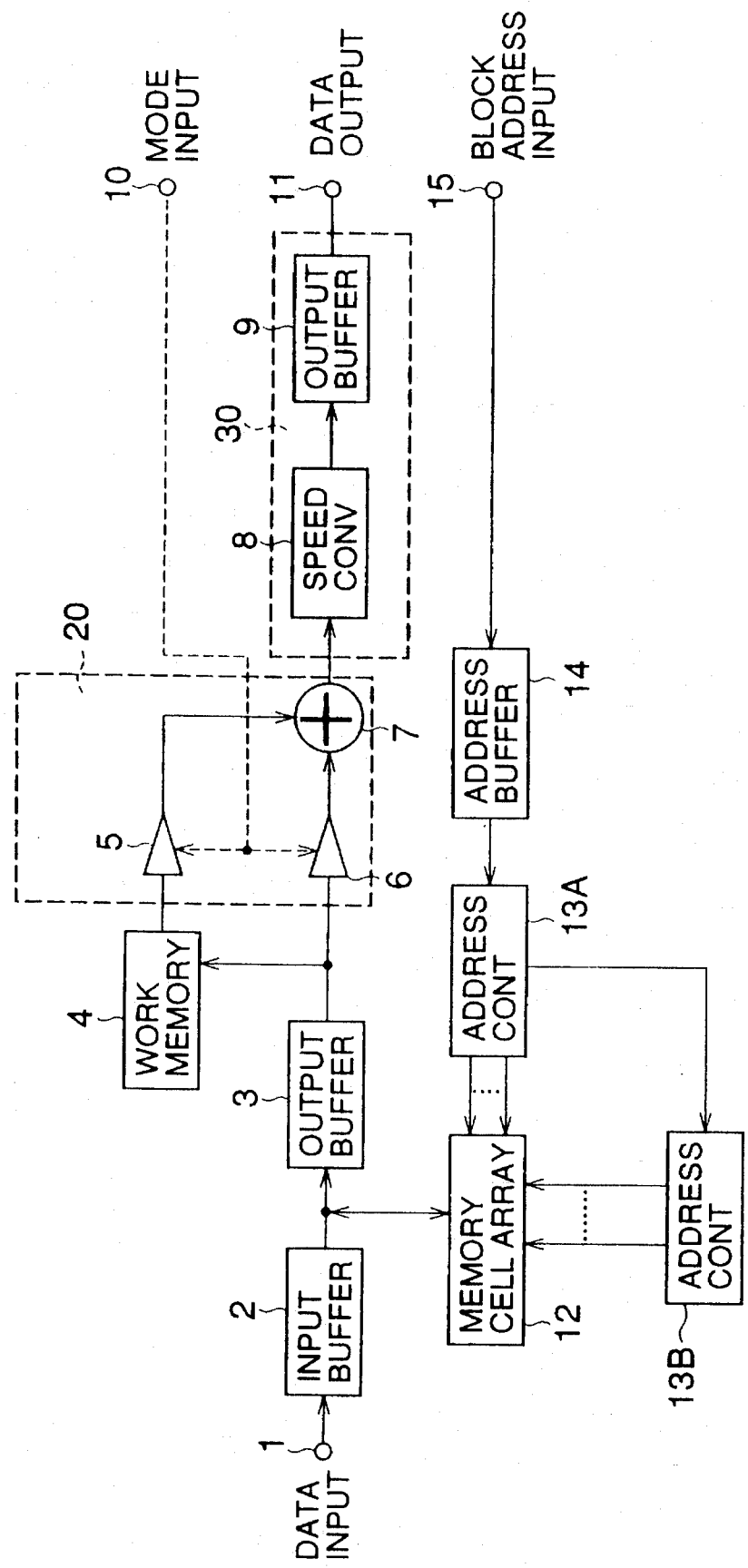
FIG. 4 is a block diagram showing a first embodiment of the image processing memory integrated circuit according to the present invention.

The image processing memory integrated circuit according to the present invention will be described hereinbelow with reference to FIGS. 4 and 5. FIG. 4 is a block diagram showing a first embodiment thereof, which shows a circuit configuration used for processing bidirectional inter-image prediction.

Figure 1:
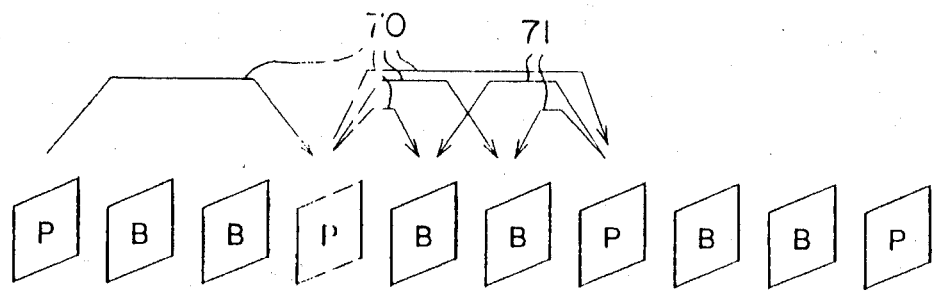
FIG. 1 is an illustration for assistance in explaining an example of inter-image prediction including the bidirectional prediction.
Figure 3:
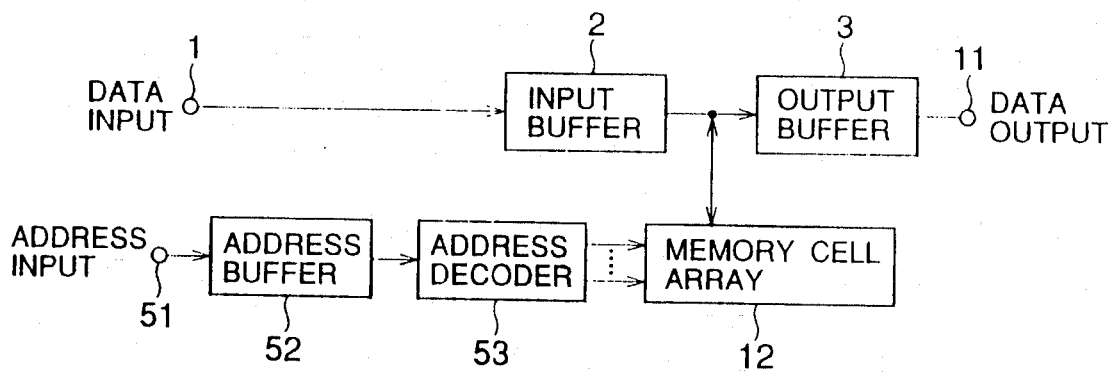
FIG. 3 is a block diagram showing an example of the prior art image processing memory integrated circuit.

In FIG. 4, the same reference numerals have been retained for the similar elements which have the same functions as with the case of the prior art integrated circuit shown in FIG. 3, without repeating the description thereof.

The integrated circuit shown in FIG. 4 is mainly different from that shown in FIG. 3 in that a first address controller 13A, a second address controller 13B, a work memory 4, two multipliers 5 and 6, an adder 7 and a speed converter 8 are additionally provided for processing weighted addition.

The memory cell array 12 is main storing means, and the work memory 4 is subsidiary storing means. The multipliers 5 and 6 and the adder 7 constitute an addition circuit (adding means) 20. The speed converter 8 and the output buffer 9 constitute output circuit (outputting means) 30.

The address signal inputted through a block address input terminal 15 is a logical address to be given to the first address controller 13A via an address buffer 14. The output of the first address controller 13A is given to the second address controller 13B and the memory cell array 12, and the output of the second address controller 13B is given to the memory cell array 12.

On the basis of information indicative of a start position of an inputted block to be processed, the first address controller 13A and the second address controller 13B have continuous access to 16×16 pixels in the memory cell array 12.

More specifically, the first address controller 13A repeats the physical address shift operation pixel by pixel from a starting point to an end point in the row direction in the two-dimensional block.

The second address controller 13B increments one column whenever the first address controller 13A completes the shift operation from the starting point to the end point along one row. As described above, the second address controller 13B shifts the physical address pixel by pixel from a starting point to an end point in the column direction in the two-dimensional block.

At the write timing, the video signals inputted through the data input terminal 1 are written in any designated positions of the memory cell array 12 through the input buffer 2. For addition processing, the video signals for one sample (i.e., one pixel) are always inputted. In more detail, 8 bits for each pixel, for instance are inputted. In the prior art example, the video signals can be stored 4 bits by 4 bits in the two memory integrated circuits, being different from the present invention.

Video signals for two frames composed of decoded video signals of the forward direction prediction frame and decoded video signals of the reverse direction prediction frame are stored in the memory cell array 12. At the read timing, the above-mentioned two video signals are read, so that it is possible to read the video signals at a speed twice higher than that of the video signals to be processed. Here, the video signals are handled for each sample, that is, in unit of 8 bits for one pixel.

The decoded video signals of the forward direction prediction frame read from the designated positions of the memory cell array 12 are first given to the work memory 4 via the output buffer 3. The work memory 4 is composed of a small capacity SRAM or 2048 flip-flop circuits, for instance, which can store the video signals for one block.

Further, the decoded video signals of the reverse direction prediction frame are read from the memory cell array 12, and then given to the multiplier 6 via the output buffer 3. At the same time, the output of the work memory 4 is given to the multiplier 5.

In the addition circuit 20, the outputs of the output buffer 3 and the work memory 4 are added being weighted according to the prediction mode (only the forward direction, only the reverse direction, an average of both the directions). In other words, in the multipliers 5 and 6, the respective coefficients K3 and K4 are multiplied for each input video signal according to the prediction mode given via the mode input terminal 10. In this case, the coefficients K3 and K4 are selected from 0, 0.5 and 1, respectively for each block, in correspondence to the prediction modes of three sorts.

The reproduced video signals weighted by the multipliers 5 and 6, respectively are given to the adder 7. In the adder 7, both the signals are added to each other to form completed prediction signals. The formed prediction signals are given to the speed converter 8.

The output circuit 30 is composed of the speed converter 8 and the output buffer 9. Further, the speed converter 8 is composed of FIFO type buffers of different writing speeds and reading speeds. In the speed converter 8, the prediction signals written at a speed twice higher than that of the signals to be processed can be read at the speed the same as that of the signals to be processed. Further, it is possible to read the prediction signals from the speed converter 8 at any given speed, according to the configuration of the speed converter 8.

The completed prediction signals are outputted from the data output terminal 11 via the output buffer 9.

Figure 5:
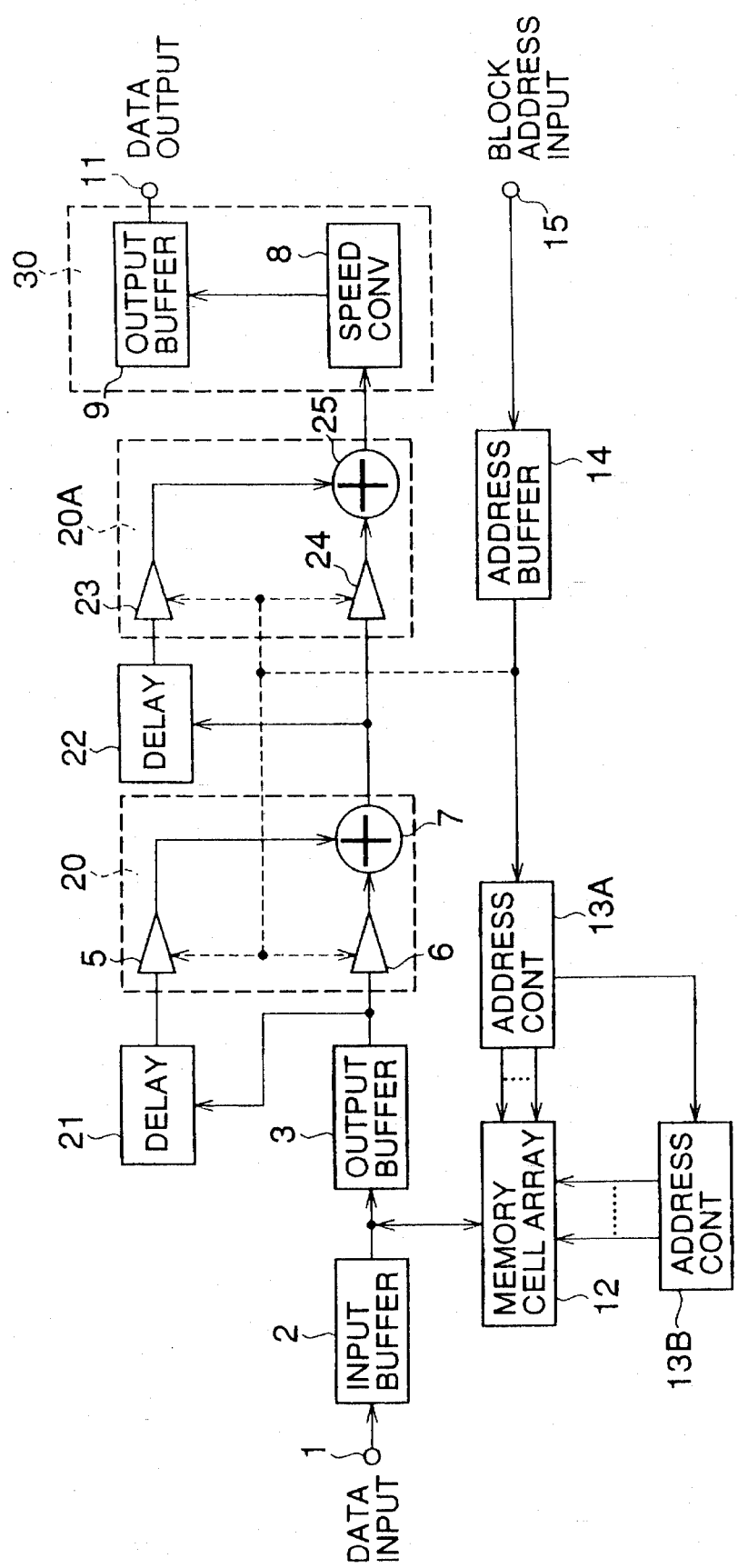
FIG. 5 is a block diagram showing a second embodiment of the image processing memory integrated circuit according to the present invention.

FIG. 5 is a block diagram showing a second embodiment of the image processing memory integrated circuit according to the present invention, by which motion compensation processing can be executed on a precision finer than one pixel.

In FIG. 5, the same reference numerals have been retained for the similar elements which have the same functions as with the case of the first embodiment shown in FIG. 4, without repeating the description thereof. The integrated circuit shown in FIG. 5 is mainly different from that shown in FIG. 4 in that two delay circuits 21 and 22 are additionally provided.

The address signal inputted through the block address input terminal 15 is given to the address controllers 13A and 13B via the address buffer 14. The address controllers 13A and 13B and the memory cell array 12 function basically in the same way as with the case shown in FIG. 4, except that the video signals for one frame are stored in the memory cell array 12 (unidirectional prediction).

At the write timing, the video signals inputted through the data input terminal 1 are written in the designated positions of the memory cell array 12 through the input buffer 2.

At the read timing, for executing the motion compensation on the precision of ½ pixel, the video signals (pixel values) of 17×17 two-dimensional block (expanded from the 16×16 block to be processed) are read from the memory cell array 12, and then two video signals shifted pixel by pixel are added by the addition circuit 20.

The reproduced video signals read from the designated positions of the memory cell array 12 are given to the delay circuit 21 and the multiplier 6 via the output buffer 3.

The reproduced video signals are in unit of 17×17 pixels (this unit is one pixel larger than that of the processed block in both the row and column lines, respectively). The 8-bits for each pixel are read simultaneously. Further, since the video signals are read only once being different from the integrated circuit shown in FIG. 4, the read speed is not twice as high as that of the video signals to be processed by the circuit shown in FIG. 4; that is, the read speed is (17×17) / (16×16)= 1. 13 times.

In the delay circuit 21, the video signals are delayed by one pixel, and then given to the multiplier 5. In the multipliers 5 and 6, the video signals are weighted according to the motion finer than one pixel. In other words, in the multipliers 5 and 6, the coefficients K5 and K6 are multiplied to the video signals, respectively, and the multiplied results are given to the adder 7, respectively.

The weighting processing is executed as follows: in the case where the motion compensation is on the order of ½ pixel precision, the coefficients K5 and K6 are selected from 0, 0.5 and 1; and in the case where the motion vector value includes a fraction less than one pixel (e.g., 0.5, 1.5, 2.5, etc.), both the coefficients K5 and K6 are set to 0.5.

The two video signals shifted one pixel from each other are weighted respectively, added to each other by the adder 7 as the video signals whose motion is compensated for in the horizontal direction, and then given to the delay circuit 22 and the multiplier 24.

In the delay circuit 22, the video signals are delayed spatially by 17 pixels, that is, by one pixel in the vertical direction, and then given to the multiplier 23. In the multipliers 23 and 24, the coefficients K7 and K8 which are 0 or more but less than 1 are multiplied, respectively. The operations of the multipliers 23 and 24 and the adder 25 are the same as those of the multipliers 5 and 6 and the adder 7. The video signals whose vertical motion is compensated in the vertical direction are obtained by the adder 25 and then given to the speed converter 8. The effective 16×16 pixels of the 17×17 pixels inputted to the speed converter 8 are outputted at a uniform speed, and then outputted from the data output terminal 11 via the output buffer 9. On the other hand, the pixel values arranged in the row and column lines expanded and outputted by the memory cell array 12 are discarded.

An embodiment of the image decoding apparatus which uses the first embodiment (shown in FIG. 4) of the image processing memory integrated circuit will be described hereinbelow with reference to FIG. 6.

Figure 2:
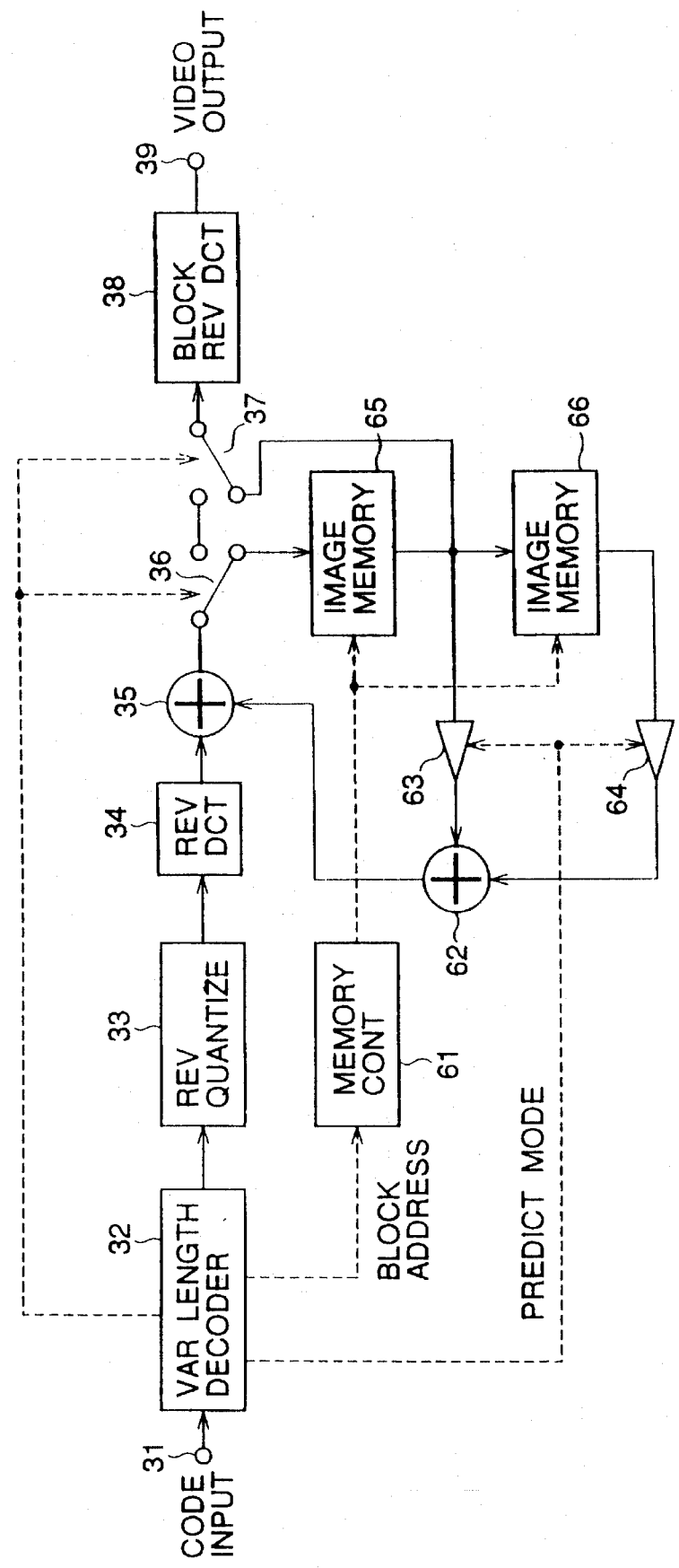
FIG. 2 is a block diagram showing an example of the prior art decoding apparatus.
Figure 6:
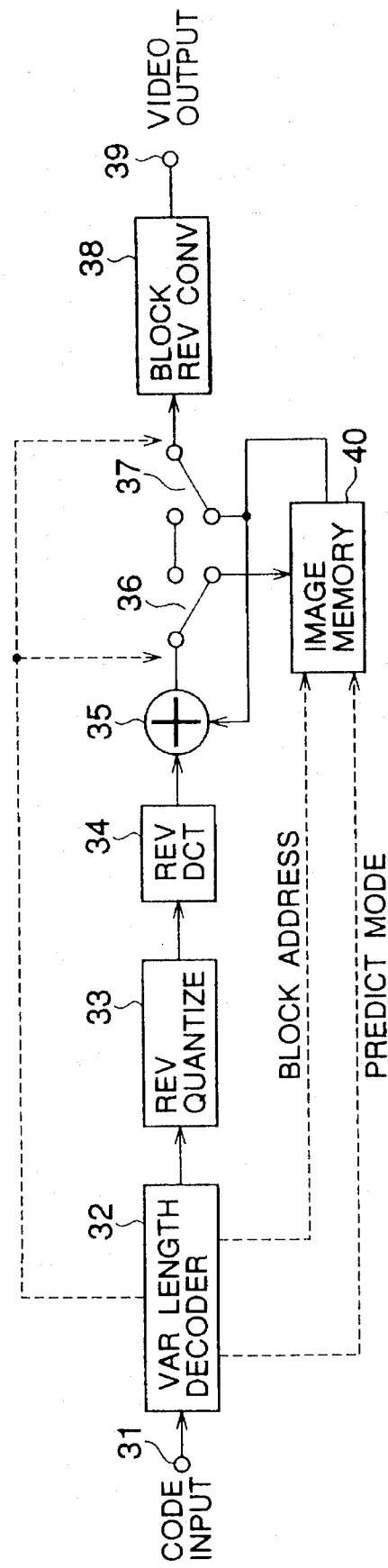
FIG. 6 is a block diagram showing an embodiment of the decoding apparatus using the image processing memory integrated circuit according to the present invention.

In FIG. 6, the same reference numerals have been retained for the similar elements which have the same functions as with the case of the prior art apparatus shown in FIG. 2, without repeating the description thereof.

In the decoding apparatus shown in FIG. 6, the adder 62, the multipliers 63 and 64 and the main controller 61 all incorporated in the prior art example are eliminated.

In FIG. 6, the codes of the compressed image information are inputted to a variable length decoder 32 through a code inputting terminal 31. In the variable length decoder 32, the variable length codes are returned to the fixed length codes, and the obtained fixed length codes are given to a reverse quantizer 33. Further, an address of the processed block and the prediction mode information are given to an image memory 40 related to the present invention, and the frame type information (P frame or B frame) is given to two switches 36 and 37, respectively.

The operations of the variable length decoder 32, the reverse quantizer 33, the reverse DCT 34, the prediction signal adder 35, the switches 36 and 37, and the block reverse converter 38 are all the same as those of the prior art example shown in FIG. 2. The reproduced video signals are outputted through the video outputting terminal 39.

The image memory 40 is the image processing memory integrated circuit which corresponds to the first embodiment of the present invention as shown in FIG. 4. By this image memory 40, the address information and the prediction mode of the block can be given, and the prediction signals including the bidirectional frame addition are formed.

An embodiment of image rate converting apparatus will be described hereinbelow, as the apparatus for adding a plurality of images and processing the added images.

As the motion video signals for TV, for instance, there are video signals with an image rate of 60 fields per second as with the case of NTSC system and video signals with an image rate of 50 fields per second as with the case of PAL system. In addition, the film used for a motion picture is 24 frames per second.

Therefore, when the video signals having different image rates (the number of images per unit time) are synthesized, it is necessary to convert the image rates.

Figure 7:
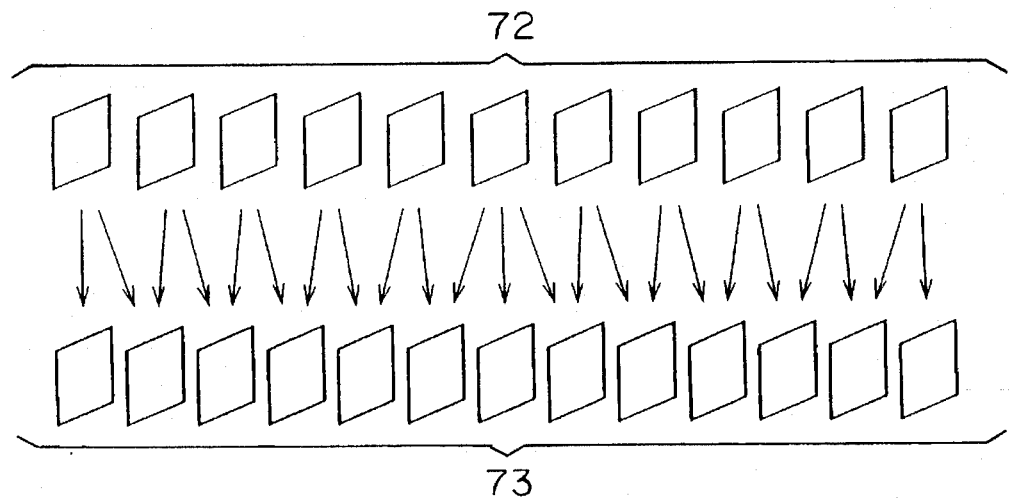
FIG. 7 is an illustration for assistance in explaining the status of image rate transformation.

FIG. 7 is an illustration for assistance in explaining the image rate conversion, in which video signals of 50 fields per second are converted into those of 60 fields per second.

As shown in FIG. 7, the output images can be formed by mixing the two input images different from each other with respect to time at an appropriate rate corresponding to the time relationship, in the fields other than the fields synchronizing with the input images.

Figure 8:
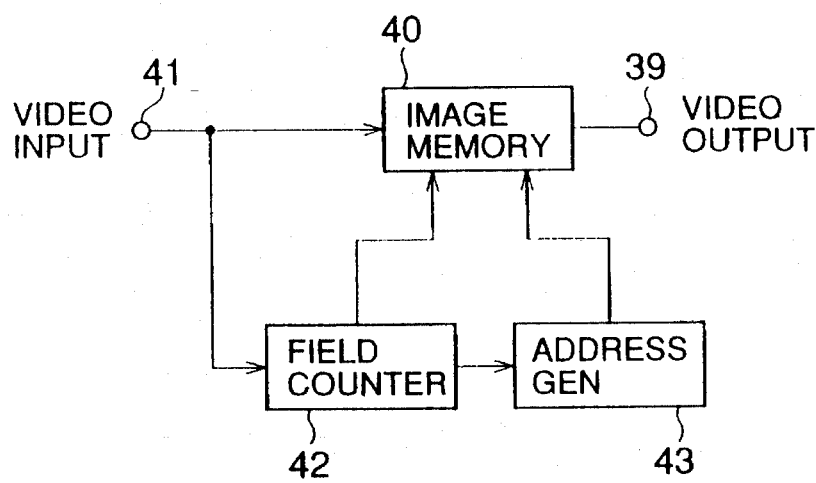
FIG. 8 is a block diagram showing an embodiment of the image rate transformation apparatus using the image processing memory integrated circuit according to the present invention.

FIG. 8 is a block diagram showing an embodiment of the image rate converting apparatus which uses the image processing memory integrated circuit according to the present invention for processing inter-image prediction for the bidirectional prediction.

In FIG. 8, the image memory 40 is the same as the first embodiment of the image processing memory integrated circuit according to the present invention shown in FIG. 4. The video signals of 50 fields per second inputted through a video inputting terminal 41 are given to the image memory 40 and a field counter 42. In the field counter 42, the numerals 1 to 5 are assigned to the fields for each 5 fields to obtain an interpolation ratio of the converted images determined by the filed counter 42. The obtained interpolation ratios are given to the image memory 40.

In an address generator 43, the address of the images of 50 fields per second (i.e., the first image address) and the address of the images of 60 fields per second (i.e., the second image address) are generated and then given to the image memory 40.

In the image memory 40, the input video signals are written at the rate of 50 fields per second on the basis of the first image address, and read at the rate of 60 fields per second on the basis of the second image address, so that two signals are added at the interpolation ratio according to the field number to form the converted images. As described above, the video signals whose image rate is converted are outputted through a video output terminal 39.

As described in detail above, in the image processing memory integrated circuit according to the present invention, since a plurality of images are stored, since the plural images are added in the memory, and since the completed video signals are obtained before outputted, it is possible to allow the transmission speed to be high relative to the signals to be processed only within the integrated circuit; that is, it is possible to output the complete signals from the memory at a low transmission speed. On the other hand, within the integrated circuit, since the signals are transmitted at short distances without being susceptible to noise, the high speed transmission can be realized relatively easily.

Further, when the image processing memory integrated circuit according to the present invention is used, it is possible to reduce the number of the transfer lines (bus) for the image data and thereby to reduce the number of input/output pins for connecting the image processing memory integrated circuit to a signal processing circuit. As a result, the image processing apparatus can be realized at more economical cost.

What is claimed is:

1. An image processing memory integrated circuit for processing digital image information between images different with respect to time, which comprises:

main storing means for storing image pixel values and outputting the pixel values in unit of spatial two-dimensional pixel block;

subsidiary storing means for storing the pixel values outputted by said main storing means and outputting the pixel values in unit of spatial two-dimensional pixel block;

adding means for weighting and adding the outputs of said main storing means and said subsidiary storing means, objects to be processed by said adding means being spatially adjacent pixel blocks of two images different with respect to time;

a first address controller for repeating operation of shifting pixel by pixel a physical address of one row or one column of the two-dimensional block provided in said main storing means; and a second address controller for shifting pixel by pixel a physical address in a direction different from that of said first address controller, whenever said first address controller has completed the shift operation beginning from a start point to an end point in one row or one column.

2. An image processing memory integrated circuit for processing digital image information between images different with respect to time, which comprises:

main storing means for storing image pixel values and outputting the pixel values in unit of spatial two-dimensional pixel block;

delaying means for delaying and outputting the output of said main storing means;

adding means for weighting and adding the outputs of said main storing means and said delaying means;

outputting means for outputting added results of said adding means after discarding pixels corresponding to a part of row and column pixels in the spatial two-dimensional pixel block;

a first address controller for repeating operation of shifting pixel by pixel a physical address of one row or one column of the two-dimensional block provided in said main storing means; and a second address controller for shifting pixel by pixel a physical address in a direction different from that of said first address controller, whenever said first address controller has completed the shift operation beginning from a start point to an end point in one row or one column.

3. An image processing memory integrated circuit for processing digital image information between images different with respect to time, which comprises:

main storing means for storing image pixel values and outputting the pixel values in unit of spatial two-dimensional pixel block;

delaying means for delaying and outputting the output of said main storing means;

adding means for weighting and adding the outputs of said main storing means and said delaying means;

outputting means for outputting added results of said adding means after discarding pixels corresponding to a part of row or column pixels in the spatial two-dimensional pixel block;

a first address controller for repeating operation of shifting pixel by pixel a physical address of one row or one column of the two-dimensional block provided in said main storing means; and a second address controller for shifting pixel by pixel a physical address in a direction different from that of said first address controller, whenever said first address controller has completed the shift operation beginning from a start point to an end point in one row or one column.

* * * * *